United States Patent
Winters et al.

(10) Patent No.: US 8,600,855 B2
(45) Date of Patent: Dec. 3, 2013

(54) TRANSACTION DATA REPOSITORY FOR RISK ANALYSIS

(75) Inventors: Michelle Winters, Belmont, CA (US); Kevin Siegel, Milpitas, CA (US); Charles Byce, Mill Valley, CA (US)

(73) Assignee: Visa International Service Association, San Francisco, CA (US)

( * ) Notice: Subject to any disclaimer, the term of this patent is extended or adjusted under 35 U.S.C. 154(b) by 586 days.

(21) Appl. No.: 12/844,694

(22) Filed: Jul. 27, 2010

(65) Prior Publication Data

US 2011/0184838 A1    Jul. 28, 2011

Related U.S. Application Data

(60) Provisional application No. 61/298,431, filed on Jan. 26, 2010.

(51) Int. Cl.
*G06Q 40/00* (2012.01)

(52) U.S. Cl.
USPC .............................. 705/35; 705/27

(58) Field of Classification Search
USPC .............................. 705/27, 35–40
See application file for complete search history.

(56) References Cited

U.S. PATENT DOCUMENTS

| | | |
|---|---|---|
| 5,732,400 A | 3/1998 | Mandler et al. |
| 2002/0138371 A1 | 9/2002 | Lawrence et al. |
| 2006/0149665 A1 | 7/2006 | Weksler |
| 2007/0174189 A1 | 7/2007 | Bishop et al. |
| 2008/0120218 A1 * | 5/2008 | Reid et al. .................. 705/37 |

FOREIGN PATENT DOCUMENTS

| KR | 10-2001-0073332 | 8/2001 |
|---|---|---|
| KR | 10-2001-0086780 | 9/2001 |
| KR | 10-2002-0021956 A | 3/2002 |
| KR | 10-2007-0080884 A | 8/2007 |

OTHER PUBLICATIONS

International Search Report (ISR) and Written Opinion mailed on Aug. 26, 2011, for PCT Application No. PCT/US2011/021402, filed Jan. 14, 2011, 10 pages.

\* cited by examiner

*Primary Examiner* — Thu Thao Havan

(74) *Attorney, Agent, or Firm* — Kilpatrick Townsend & Stockton LLP

(57) ABSTRACT

Systems and methods are presented for determining risk levels for consumer-to-consumer (C2C) transactions on brokering websites. The risk levels can be based on payment processing network (e.g. Visa) account data as well as external data, such as geo-location using IP addresses, fraud bureau data, and star ratings. The buying and selling consumers can have multiple risk scores for each transaction, such as a fraud, credit, return/chargeback, dissatisfaction, product misuse, nonreturnable, and defect risk scores. The buying and selling consumers can trade their risk levels before proceeding with the transaction.

19 Claims, 12 Drawing Sheets

TRANSACTION DATA REPOSITORY FOR RISK ANALYSIS

CROSS-REFERENCES TO RELATED APPLICATIONS

This application claims the benefit of U.S. Provisional Application No. 61/298,431, filed Jan. 26, 2010, hereby incorporated by reference in its entirety for all purposes.

BACKGROUND

1. Field of the Disclosure

Generally, methods and systems are disclosed for analyzing and presenting risk for transactions between consumers using a transaction data repository. More specifically, methods and systems are disclosed for opt-in, multi-faceted risk determinations geared toward customer-to-customer (C2C) transactions on brokerage websites such as eBay, Amazon.com, etc.

2. Discussion of the Related Art

Non-merchant consumers are more often becoming their own sellers of goods and services through websites such as eBay, Craigslist, Amazon, etc. Because the World Wide Web greatly expands the geographical reach of advertisements, more people and a more diverse audience can be reached with advertisements on such websites. This larger audience remains, for better or for worse, largely anonymous.

Some people use the anonymity of the Web and ready mobility of modern times to help perpetrate fraud, such as by initiating fraudulent purchases on such websites. Others stretch the boundaries of good faith in transactions, often returning items without reasonable cause or otherwise being a nuisance after a transaction. These people often use their anonymity as a shield.

There is a challenge in determining with which parties are safe to buy, sell, and transact. Today, one of the main standards for determining the safety of a transaction on one of the above-listed websites is, for example, a consumer's "star rating." The star rating system, typically one to five stars, is based on other consumers rating and/or reviewing their experiences during transactions with a person operating under a particular alias. However, the star rating is inherently subjective. One person's 3-star rating may be another person's 4-star rating. Furthermore, star ratings usually only apply to a particular alias or account of a person. Also a star rating typically only rates transactions facilitated through a particular vendor's web site.

Thus, there is a need for more reliable consumer-to-consumer risk profiling for transactions between consumers.

BRIEF SUMMARY

Generally, systems and methods are disclosed that include determining risk levels for consumer-to-consumer (C2C) transactions such that the risk levels are based on past payment data from a payment processing network, such as Visa, and data external to the payment processing network, such as star ratings from web sites, geo-location, and fraud bureaus. Each risk level can be based on data particular to the consumer's credit card, such as whether he uses the same card to also pay recurring payments for other bills. The risk level can also be based on one's inclination to pay her bills immediately after receiving invoices or a proclivity to wait until the last minute to pay before deadlines. The risk level can also be based on a history of returns or chargebacks made to the card, whether he often spends on the type of merchandise being bought, or other indicators internal or external to the card payment processing network.

Systems and methods can also include calculating risk levels of both buying and selling consumers in a C2C transaction and sharing the risk levels with the other party based on a mutual agreement to share the risk levels. Different types of risk levels, such as those relating to fraud, credit, returns/chargebacks, dissatisfaction, product misuse, etc. can be shared or withheld depending on what the other party shares and/or withholds.

The technical advantage of these solutions are many. They allow not just the amount of available credit in one's credit card or money in one's debit card account to facilitate a transaction, but also one's history of using the account to facilitate the transaction. That history, or a risk score or level based on that history, can be offered to another consumer to ease suspicion of fraud. One person's financial diligence, such as always paying a credit card bill right after it comes in the mail, works as an asset. Another consumer may be willing to offer a discount on something he or she is selling for this kind of data so that he has a better idea of the good faith of the party. In addition, risk scores can be 'swapped' between consumers prior to a monetary transaction. Swapping scores can serve as a preliminary, test 'transaction' to build trust between a buyer and seller who otherwise do not know each other. Swapping scores may lower stress for both a buyer and seller. As yet another technical advantage, data from a credit card account and data external to the credit card account, such as a fraud bureau score and web site star ratings, can be fused together to paint a credible, broad-based assessment of the risk in dealing with another party.

An embodiment is directed to a method comprising determining, using a processor operatively coupled to a memory, a first risk level associated with a first consumer for a proposed transaction, the first risk level based on payment data from a payment processing network. The payment processing network is configured to process credit or debit portable consumer device transactions. The first risk level is also based on data external to the payment processing network. The method further includes receiving an authorization from the first consumer to disclose the first risk level to a second consumer and sending the first risk level to the second consumer based on receiving the authorization, thereby swapping risk levels.

An embodiment is directed to a method comprising determining, using a processor operatively coupled to a memory, a first risk level associated with a first consumer for a proposed transaction, the first risk level based on transactions of the first consumer, and determining a second risk level associated with a second consumer for the transaction, the second risk level based on transactions of the second consumer. The method further includes receiving an authorization from the first consumer to disclose the first risk level to the second consumer, receiving an authorization from the second consumer to disclose the second risk level to the first consumer, and sending the first risk level to the second consumer and the second risk level to the first consumer based on receiving both authorizations.

An embodiment is directed to a method comprising determining, using a processor operatively coupled to a memory, a first set of risk levels associated with a first consumer for a proposed transaction, the first set of risk levels based on transactions of the first consumer and determining a second set of risk levels associated with a second consumer for the transaction, the second set of risk levels based on transactions of the second consumer. The method further includes receiving an authorization from the first consumer to disclose one or more of the first set of risk levels to the second consumer based on whether the second consumer authorizes disclosure of one or more of the second set of risk levels to the first consumer, receiving an authorization from the second consumer to disclose one or more of the second set of risk levels to the first consumer, and sending the one or more of the first set of risk levels to the second consumer and the one or more of the second set of risk levels to the first consumer.

An embodiment is directed to a method comprising determining, using a processor operatively coupled to a memory, a first risk level associated with a first consumer for a proposed transaction, the risk level based on at least one of the group consisting of: a history of recurring payments made with an account with which the first consumer offers to conduct the transaction; a measure of how soon after account bills are issued that payments are made to the account; a history of returns or chargebacks associated with the first consumer; a history of the first consumer purchasing a type of merchandise to be purchased in the transaction; and a past level of spend on the account. The method further comprises receiving an authorization from the first consumer to disclose the first risk level to a second consumer and sending the first risk level to the second consumer based on receiving the authorization.

An embodiment's risk level can be further based on at least one of the group consisting of: the type of merchandise to be purchased in the transaction; a channel by which the transaction is offered to be completed; a geographic location of the first consumer determined from an Internet Protocol (IP) address associated with the first consumer; and a fraud flag associated with the account or other accounts of the consumer.

Other embodiments of the invention include computer readable media including code executable by a processor, which can implement the above methods. Yet other embodiments of the invention include computers or other machines executing instructions to perform the above methods.

A further understanding of the nature and the advantages of the embodiments disclosed and suggested herein may be realized by reference to the remaining portions of the specification and the attached drawings.

Figure 1:
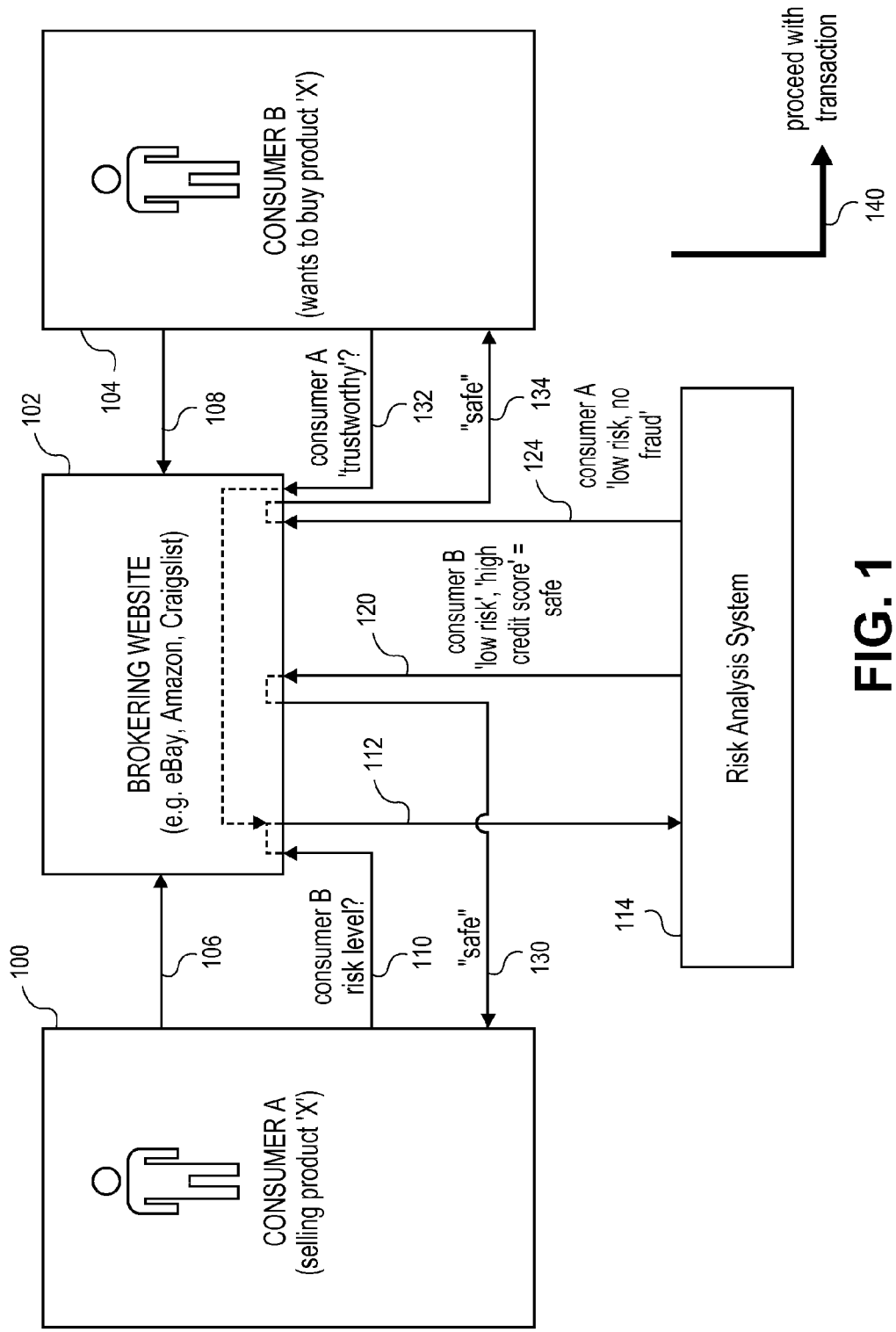
FIG. 1 illustrates a diagram of a system for analyzing risk between consumers according to an embodiment.

The figures will now be used to illustrate different embodiments in accordance with the invention. The figures are specific examples of embodiments and should not be interpreted as limiting embodiments, but rather exemplary forms and procedures.

DETAILED DESCRIPTION

Embodiments in accordance with the present disclosure generally relate to C2C risk scores and levels based on: (1) payment data from a payment processing network, such as transaction data on one's Visa card, and (2) data external to the payment processing network, such as fraud bureau information. A risk score can be based on whether the buying consumer offers to use a credit or debit card upon which she relies upon for scheduled recurring payments, whether there is a history of returns or chargebacks on the card, and/or whether the buying consumer buys similar items to the one being purchased on the card. The risk score can also be based upon whether the consumer habitually waits until the last minute (e.g. 1, 2, 3-5 days or more) to pay her credit card bill or whether she typically pays it right away after receiving the bill (e.g. 1, 2, 3-5 days or more after the mailing date of the bill). The risk score can be based upon the type of merchandise being purchased in the transaction, the channel (e.g., in person, online, telephone) by which the transaction is to be completed, the geographic location of a consumer determined from the Internet Protocol (IP) address of his computer, and/or an possible fraud alert, tag, list, or other fraud flag associated with a consumer's account.

C2C embodiments can be especially useful for transactions using brokering websites, such as eBay, Amazon.com, Craigslist, etc., that often connect random people who do not know each other and are relatively anonymous to each other. Generally, the more information known about another party, the better. A risk score based upon one's credit card use and third party data can help communicate risks without endangering one's privacy by giving specific information about particular past transactions. Using multiple sources of data can allow the risk scores to be more comprehensive than traditional credit scores or star ratings alone.

Although the prior art discloses credit and/or fraud risk analyses performed by a purchaser's own financial institution on his or her historical transactional records, account records, and/or the like, the data for such analyses does not come from third-party sources or other external data. For example, such analyses do not use the IP address of the purchaser. Using data external to accounts of the payment processing network helps independently verify risk factors as well as assign a more comprehensive risk score or level to a consumer.

Some C2C embodiments can be useful for landlord-tenant transactions. For example, a tenant may be concerned whether the landlord spends enough on maintenance for the residence or pays utility bills on time. A tenant may also wish to compare the landlord's risk level against aggregated data of other landlords for the surrounding neighborhood. A landlord may wish to see not only a credit score offered by credit reporting agencies but also other risk scores not having to do with credit. For example, a landlord may wish to avoid renting to someone who has been involved in fraud or who constantly returns items to stores or initiates chargebacks.

In some embodiments, consumer's risk scores can be traded with one another before a C2C transaction. For example, consumers can trade their fraud risk scores just before (e.g. 10-30 minutes) the transaction is commenced. Trading fraud risk scores can serve as a 'mini' test transaction so that each party is more at ease with one another for the 'real' transaction. Different types of risk scores, for example fraud, credit, return/chargeback, dissatisfaction, and product use risk scores, can be exchanged or withheld depending on a consumer's preferences in releasing such information. A consumer may opt-in to release only those risk scores that the other side discloses or may opt-in to disclose particular risk scores for each transaction.

I. Terms

A "risk level" or score is a measure of risk in dealing with a particular consumer for a proposed transaction that there might be problems with the consumer or transaction during or after the transaction. For example, there might be a high risk level in dealing with a customer who has a history of returning merchandise. As another example, there might be a low risk level for a sale of a contractor-grade lawnmower when dealing with a customer who has a history of purchasing yard and landscaping equipment. Exemplary risk level scores may be in the form of numbers, letters, or any other suitable indicia that indicate relative or absolute risk such as ordinal or cardinal indicia.

A "type of risk level" describes risk levels that share certain predefined attributes. For example, one type of risk level can signify a risk of fraud, another risk level can signify a credit risk, another risk level can signify a risk of chargebacks or returns, another risk level can indicate future dissatisfaction, and another risk level can indicate an elevated potential for product liability from a sale.

A "regularly scheduled recurring payment" includes one of a series of pre-scheduled, automatic payments to a company or organization with which a consumer has a continuing relationship. For example, a regularly scheduled recurring payment can include an auto-bill payment to an electric utility, a cellular phone company, mortgage lender, gardener, acceptor of donations or tithes, or other provider of goods or services or acceptor of auto-payments. Such payments may occur on a periodic basis including monthly, weekly, etc.

A measure of how soon after a bill is issued for a credit card account that a non-late payment for the bill is made includes a number of days that elapses after a mailing or issue date of the credit card bill before which a payment is received by the issuer. A "non-late" payment includes a payment that is made on or before the due date indicated on the bill or otherwise contractually required by the biller. A non-late payment also includes a payment made within a reasonable amount of time (e.g. 3 days, 5 days, 7 days, two weeks, etc.) after a bill is sent that is marked 'due upon receipt.'

A "chargeback" includes the return of funds to a consumer through formal channels of the consumer's financial institution involuntarily or otherwise reluctantly from a merchant or other seller. The consumer may wish to return merchandise to a merchant from whom the merchandise was purchased, but the consumer and merchant may not be able to work out a settlement. The consumer, through federal regulations and consumer protection laws for debit and credit cards can initiate a return of his funds through his bank.

A "type of merchandise" includes a set of items that share similar uses, classifications, sizes, prices, etc. For example, a tuba can be the same type of merchandise as a clarinet because both are musical instruments. As another example, a restored grandfather clock can be the same type of merchandise as an old Belleek china plate because they are both antiques.

A "level of spend" on an account includes an amount of money that is spent by the account during a time period. For example, a business traveler may own a credit card with high level of spend (e.g. over $5,000, $7,500, $10,000, or more per month) for airline tickets and hotels. A college student may own a debit card with a low level of spend (e.g. under $100, $500, $1,000 per month) for textbooks and car repairs.

A "channel" for a transaction includes in-person, by telephone, online, and other channels as known in the art.

A "fraud flag" includes an indication by a fraud bureau, credit card processing company, government, or other institution that an account may have been compromised by a non-owner of the account. A fraud flag can be initiated by an owner of an account, such as a consumer whose name is on a credit card, or can be initiated by other authorities based on behavioral factors and other warnings, such as a card that appears to have been 'tested' at gasoline stations associated with fraudsters.

II. Discussion Of Embodiments

FIG. 1 illustrates a system for analyzing risk between consumers according to an embodiment of the technology. Consumer A 100 and consumer B 104 are consumers who wish to transact with one another via a brokering system, such as brokering website 102. Brokering website 102 can be any website that consumers use to buy and sell goods from one another. For example, eBay, Amazon, and Craigslist can be brokering websites. Social networking sites, such as Facebook, MySpace, Twitter, LinkedIn, can also be brokering websites. In the example shown in FIG. 1, consumer A 100 is a consumer who wishes to sell product 'X', and consumer B 104 is a consumer who wishes to buy product 'X'. Consumer A 100 transacts with consumer B 104 using the brokering website 102, with which consumer A 100 can connect via network connection 106. Similarly, consumer B 104 can transact with consumer A 100 using the brokering website 102, with which consumer B 104 can connect via network connection 108.

When consumer A 100 and consumer B 104 initiate a transaction for product 'X', they can request risk analysis information about one another from risk analysis system 114 via brokering website 102. In the exemplary embodiment, risk analysis system 114 is used to check the transaction risk data of consumer A 100 and/or consumer B 104. For example, risk analysis system 114 can check if consumer A 100 has been involved in any fraud and/or can check the risk level associated with consumer A 100. Risk analysis system 114 can also check the risk level and/or credit history associated with consumer B 104.

Specifically, consumer A 100 may wish to obtain transaction risk data associated with the risk of transacting with consumer B 104 before deciding to sell product 'X' to consumer B 104. Consumer A 100 can contact risk analysis system 114 through brokering website 102 to obtain the transaction risk data in order to determine whether consumer B 104 is trustworthy, a hassle to deal with, etc. Consumer A 100 sends the request for transaction risk data to brokering website 102, shown as request 110, which then forwards the request to risk analysis system 114, shown as forwarded request 112. Risk analysis system 114 checks a transaction data repository containing relevant data for determining the risk of transacting with consumer B 104. Once the requested information (e.g., risk level, credit history) is retrieved, risk analysis system 114 sends the transaction risk data to brokering website 102, shown as response 120. For example, risk analysis system 114 may return transaction risk data indicating that consumer B 104 is a low risk' consumer with whom to conduct a transaction. Risk analysis system 114 may also return an indication that consumer B 104 has a high credit score. These indications show that consumer B 104 is a relatively 'safe' consumer with whom to conduct a transaction. This information is then forwarded from brokering website 102 to consumer A 100, shown as forwarded response 130. Once consumer A 100 obtains the transaction risk data for consumer B 104, consumer A 100 can then decide whether or not to proceed with the transaction with consumer B 104, shown as flow 140.

Similarly, consumer B 104 may wish to obtain transaction risk data associated with the risk of transacting with consumer A 100 before deciding to buy product 'X' from consumer A 100. Consumer B 104 sends a request for transaction risk data to brokering website 102 to determine if consumer A 100 is trustworthy, shown as request 132. Brokering website 102 forwards this request to risk analysis system 114, shown as forwarded request 112. Risk analysis system 114 checks its transaction data repository containing relevant data for determining the risk of transacting with consumer A 100. Once the requested information (e.g., fraud, risk level) is retrieved, risk analysis system 114 sends the transaction risk data to brokering website 102, shown as response 124. For example, risk analysis system 114 may return transaction risk data indicating that consumer A 100 is a low risk' consumer with whom to conduct a transaction. Risk analysis system 114 may also return an indication that consumer A 100 has not been involved in any fraud. These indications show that consumer A 100 is a 'safe' consumer with whom to conduct a transaction. This information is then forwarded from brokering website 102 to consumer B 104, shown as forwarded response 134. Once consumer B 104 obtains the transaction risk data for consumer A 100, consumer B 104 can then decide whether or not to proceed with the transaction with consumer A 100, shown as flow 140.

Risk analysis system 114 aggregates data from various sources in its transaction data repository in order to determine the risk of transacting with other consumers. In one embodiment, risk analysis system 114 is associated with a payment processing network such as a credit card payment network. This payment processing network can serve as one of the many sources for transaction risk data. Examples of this would be payment history data, chargeback data, the frequency with which a consumer returns goods, or exception data (e.g., disputes) from a payment processing network such as VisaNet. A single transaction, such as the pending transaction, can trigger an increase in risk levels. Additionally, risk analysis system 114 can aggregate data from other, external sources, including fraud bureau data or other third-party data (e.g., websites, credit scores, user feedback, etc.). Data from the fraud bureau can be used to determine if a consumer was previously involved in fraud or theft. If a consumer has been involved in fraud, risk analysis system 114 can indicate the type of fraud in which the consumer was involved. Risk analysis system 114 can also use the geolocation of a consumer (e.g. IP addresses, etc.) to determine that the consumer involved in the transaction is actually in the location indicated by that consumer. For example, consumer A 100 may indicate to consumer B 104 that consumer A 100 is in a particular location. Risk analysis system 114 can verify that this is true by checking the IP address of consumer A 100. The transaction risk data can further be compiled by accumulating data about a consumer from accounts owned by that consumer. For example, the addresses or zip codes on the consumer's credit card, debit card, savings account, mobile phone account, etc. can be checked to verify that they are in the same location as where the consumer says he is. The various sources used by risk analysis system 114 in its transaction data repository ensure that the transaction risk data associated with a consumer is unique and individualized for that consumer, ensuring that transacting with the consumer is relatively safe.

In one embodiment, the transaction risk data that is returned to either consumer can be in the form of a color indication. For example, for consumers having little transaction risk, a green indication can be returned to the requesting consumer. If conducting a transaction with a consumer is somewhat risky, a yellow indication can be returned to the requesting consumer. If conducting a transaction with a consumer is very risky, a red indication can be returned to the requesting consumer.

In one embodiment, risk analysis system 114 allows transactions between consumers to be held in escrow. That is, a transaction occurring through brokering website 102 can be held in escrow until the proper consumer transaction risk data is retrieved and sent to the requesting consumer. Each consumer can choose to close escrow upon reviewing the transaction risk information for the consumer with whom they are transacting.

In one embodiment, brokering website 102 can provide an opt-in option for consumers. This option allows consumers to consent to and register for the risk analysis features. This system allows for the use of unique identifiers, credit card numbers, and other identifying features to differentiate one consumer from another. The brokering website 102 could require the registered consumer to log into an account on the brokering website 102 in order to use the features of the risk analysis system.

In one embodiment, the use of the risk analysis system by consumers can be incentivized by providing benefits for using the system, such as discounts that will be described below.

In one embodiment, the risk analysis system 114 can be used through a brokering system which facilitates peer-to-peer or purchase money loans. The transaction risk data can be sent to consumers who wish to borrow money from another consumer or lend money to another consumer.

Figure 2:
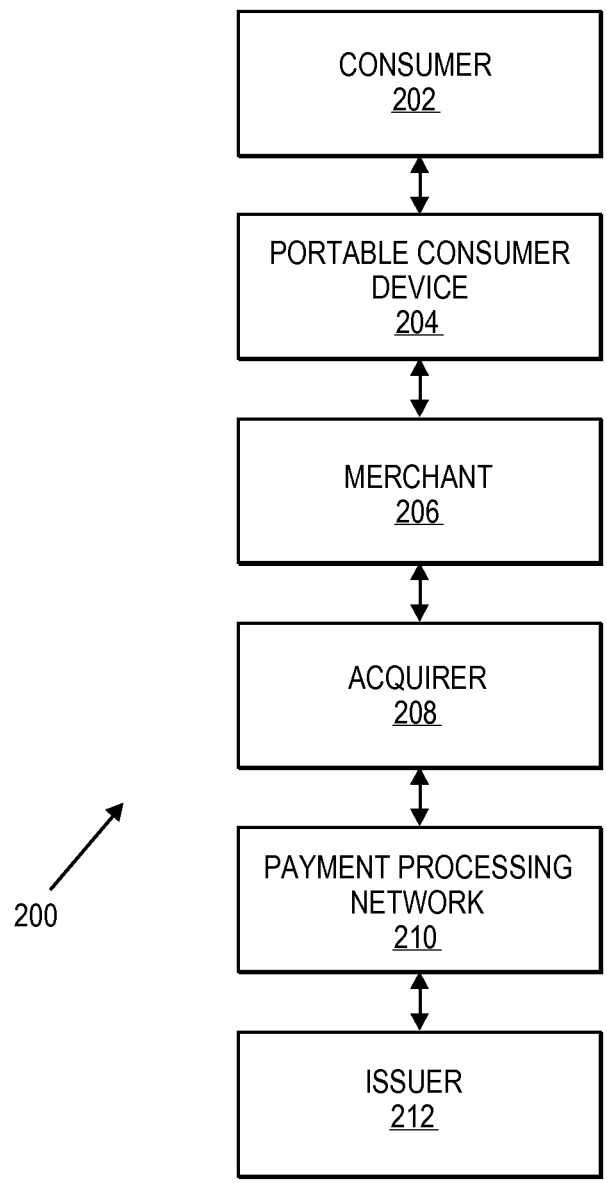
FIG. 2 illustrates a system for a payment from a payment processing network in accordance with an embodiment.

FIG. 2 illustrates a system for a payment from a payment processing network or system whose data may be used to calculate a risk level. Payment processing network 210 is configured to process credit card transactions, debit card transactions, or other portable consumer device transactions. Data relating to such transactions, including purchases, refunds, etc., can be referred to as payment data.

Payment data for a consumer can be obtained in any suitable manner from his or her credit card, debit card, or other payment account portable consumer device account. The system 200 includes merchant 206 and acquirer 208 (e.g. a bank) associated with merchant 206. In a typical payment transaction, consumer 202 may purchase goods or services at the merchant 206 using portable consumer device 204. Acquirer 208 can communicate with issuer 212 (e.g. another bank) via payment processing network 210.

The portable consumer device 204 may be in any suitable form. For example, suitable portable consumer devices can be hand-held and compact so that they can fit into a consumer's wallet and/or pocket (e.g., pocket-sized). They may include smart cards, ordinary credit or debit cards (with a magnetic strip and without a microprocessor), keychain devices (such as the Speedpass™ commercially available from Exxon-Mobil Corp.), etc. Other examples of portable consumer devices include cellular phones, personal digital assistants (PDAs), pagers, payment cards, security cards, access cards, smart media, transponders, and the like. The portable consumer devices can also be debit devices (e.g., a debit card), credit devices (e.g., a credit card), or stored value devices (e.g., a stored value card).

Payment processing network 210 may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services.

Payment processing network 210 may include a server computer. A server computer is typically a powerful computer or cluster of computers. For example, the server computer can be a large mainframe, a minicomputer cluster, or a group of servers functioning as a unit. In one example, the server computer may be a database server coupled to a web server. Payment processing network 210 may use any suitable wired or wireless network, including the Internet.

Merchant 206 may also have, or may receive communications from, an access device that can interact with portable consumer device 204. The access devices according to embodiments of the invention can be in any suitable form. Examples of access devices include point of sale (POS) devices, cellular phones, PDAs, personal computers (PCs), tablet PCs, handheld specialized readers, set-top boxes, electronic cash registers (ECRB), automated teller machines (ATMs), virtual cash registers (VCRs), kiosks, security systems, access systems, and the like.

If the access device is a point of sale terminal, any suitable point of sale terminal may be used including card readers. The card readers may include any suitable contact or contactless mode of operation. For example, exemplary card readers can include RF (radio frequency) antennas, magnetic stripe readers, etc. to interact with portable consumer devices 204.

In a purchase transaction, consumer 202 purchases a good or service at merchant 206 using a portable consumer device 204 such as a credit card. The consumer's portable consumer device 204 can interact with an access device such as a POS (point of sale) terminal at merchant 206. For example, consumer 202 may take a credit card and may swipe it through an appropriate slot in the POS terminal. Alternatively, the POS terminal may be a contactless reader, and portable consumer device 204 may be a contactless device such as a contactless card.

During the purchase transaction, an authorization request message is forwarded to acquirer 208. After receiving the authorization request message, the authorization request message is then sent to payment processing network 210. Payment processing network 210 then forwards the authorization request message to issuer 212 of the portable consumer device 204.

After issuer 212 receives the authorization request message, issuer 212 sends an authorization response message back to payment processing network 210 to indicate whether or not the current transaction is authorized (or not authorized). Transaction processing system 210 then forwards the authorization response message back to acquirer 208. Acquirer 208 then sends the response message back to merchant 206.

After merchant 206 receives the authorization response message, the access device at merchant 206 may then provide the authorization response message for consumer 202. The response message may be displayed by the POS terminal, or may be printed out on a receipt.

At the end of the day, a normal clearing and settlement process can be conducted by transaction processing system 210. A clearing process is a process of exchanging financial details between and acquirer and an issuer to facilitate posting to a consumer's account and reconciliation of the consumer's settlement position. Clearing and settlement can occur simultaneously.

The transaction or payment data can be captured by payment processing network 210, and a computer apparatus in the payment processing network (or other location) may process the transaction data as described in this application. The captured transaction data can include data including, but not limited to: the amount of a purchase, the merchant identifier, the location of the purchase, whether the purchase is a card-present or card-not-present purchase, etc.

The consumer's account used for the transaction can be associated with other data concerning the consumer, such as the consumer's address, telephone number, gender, etc. The account may be tied to other accounts or it may be standalone. For example, a consumer can have multiple Visa accounts through different banks.

Data external to the payment processing network includes information that is not derived directly or indirectly from a consumer's account in the payment processing network. For example, residence location data from a consumer's Facebook page can be external data. As another example, the IP address of the consumer's computer can be external data. As yet another example, information from a fraud bureau such as whether the consumer has been involved in fraud or scams previously can be external data.

Figure 3:
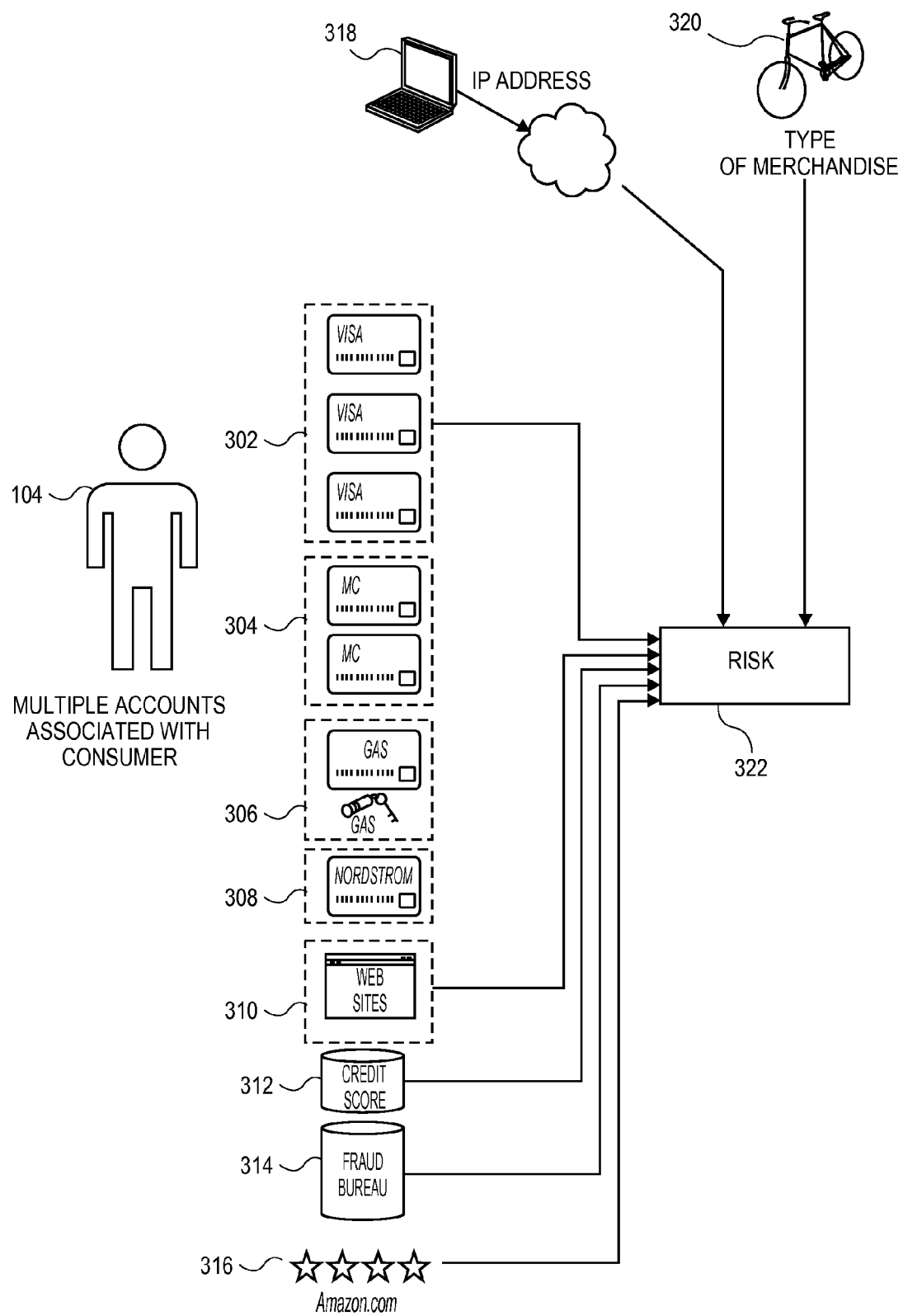
FIG. 3 illustrates sources of risk level inputs in accordance with an embodiment.

FIG. 3 illustrates sources of risk level inputs. For example, consumer 104 may have multiple credit card accounts through different banks, such as Visa cards 302, MasterCards 304, and Nordstrom card 308. Gas cards and/or keychain device 306 can also be sources of payment information. For example, whether a consumer pays his or her gas card immediately after receiving a bill can indicate the reliability of the consumer. Web sites 310 (e.g. Facebook, MySpace, LinkedIn, Twitter) such as social network-type Web sites can also be sources of information for input into a risk score. For example, one's Facebook page may indicate that the consumer lives in Ohio, but the proposed transaction is supposed to ship merchandise to Florida. Credit reporting agency 312 and fraud bureau 314 can also be sources. Brokerage website star system 316 can also be fed into the risk level determination. The IP address of the consumer's computer 318 can be used to assess whether the consumer is located in the same location as his or her other accounts or whether the typed-in shipping address is local to the consumer. Type of merchandise 320 can also be used as an input. For example, a consumer who regularly purchases musical instruments may present a lower risk of returning an electric guitar than one who has never purchased a musical instrument before. A single transaction can trigger an increase in risk for the consumer, whether the transaction is in the consumer's history or is the proposed transaction. For example, a high dollar amount bet at a casino for the proposed transaction can increase a risk score and therefore launch an action.

Embodiments can combine inputs by normalizing the inputs and add a weighted sum of the normalized inputs to arrive at a risk score or risk level. As an example of inputs, a fraud risk level can be based on the level of and changes in the amount of spend in an account, the number of distinct recurring payment transactions scheduled, the longevity of an account, whether one pays his Visa bill immediately or at the last minute, whether the consumer has bought similar items in the past, whether the consumer has purchased items at the same category of merchant (e.g. same Merchant Category Code (MCC)), whether the transaction is to be with the card present or a Card Not Present (CNP) transaction, whether the consumer's computer IP address is in the same locale as the shipping address, whether there are any fraud flags on the account from fraud bureaus or from payment processing network algorithms determining 'testing,' whether the card has an elevated number of returns and/or chargebacks, whether the same consumer has a high or low star rating on Amazon.com, etc. A flag indicating a high-stakes bet at a gambling table (for the proposed transaction) can be an input. As an example of normalization, one can normalize an account's change in the amount of spend by expressing it as a percentage. For example, if a consumer spent $3,000 in the last five days but only spent an average of $1,000 over the preceding twelve months, then the change in the level of spend can be expressed as +300%. The change in spend may be weighted (e.g. 5%) and added to other weighted risk factors to arrive at a risk score or level. For example, a CNP transaction in which the shipping address is not in the same state as the IP address and the level of spend has jumped +300% in the last few days might have a 90 out of 100 risk level. Normalization processing can occur in a centralized server or server clusters, such as a server operated by brokering website 102 (FIG. 1) or risk analysis system 114, payment processing network 210 (FIG. 2), acquirer 208, or issuer 212, or by distributed processors.

Figure 4A:
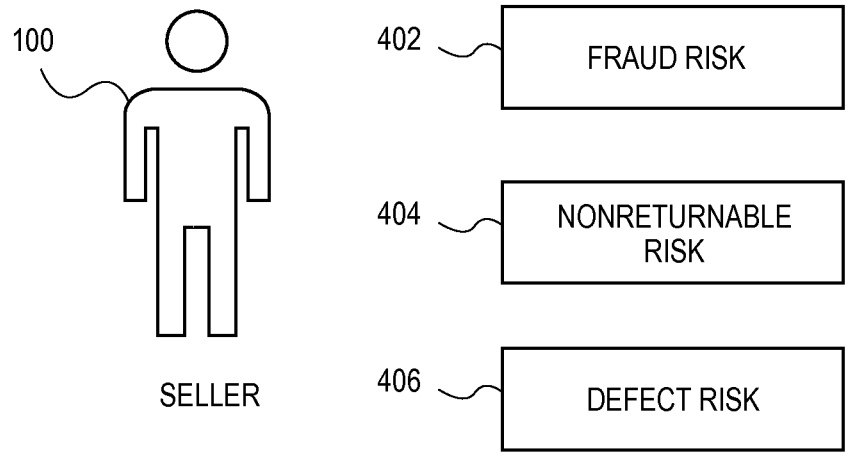
FIG. 4A illustrates types of risk levels for a seller in accordance with an embodiment.
Figure 4B:
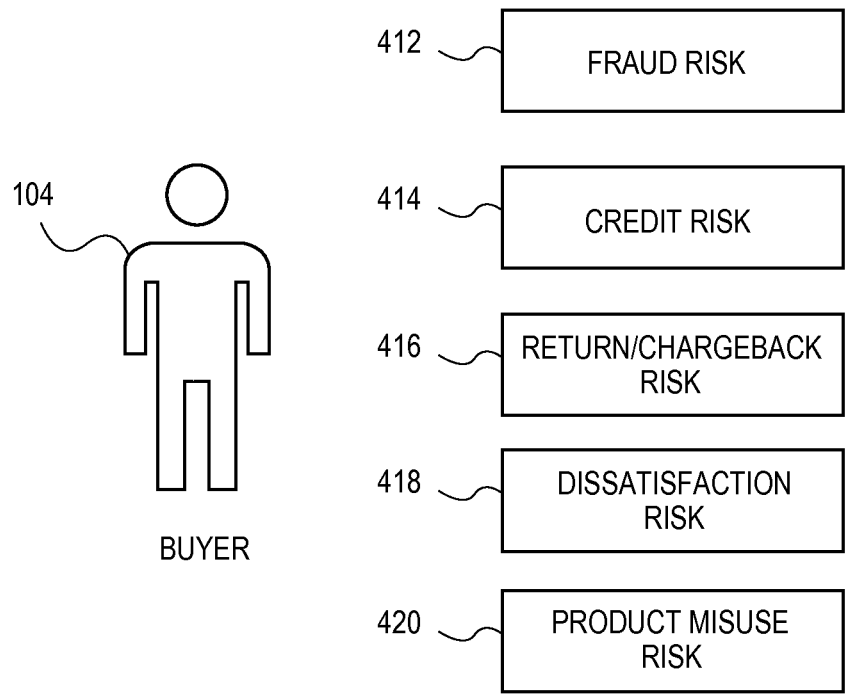
FIG. 4B illustrates types of risk levels for a buyer in accordance with an embodiment.

FIGS. 4A and 4B illustrate types of risk levels for a seller and buyer, respectively, in accordance with an embodiment. There are different types of risk in dealing with an unknown party. There are risks that either party is not authentic or is violating laws concerning fraud. There are risks that a seller may make it impossible to return an item, regardless of a stated return policy, or that poor quality increases the chances that there are defects in the merchandise to be purchased. There are risks that a buyer, otherwise authentic, may not be able to pay because of poor credit. There may be other risks that a buyer, who may be authentic and able to pay, will simply return the merchandise after using it. For example, a buyer may purchase study-at-home books and then return them when finished. There are risks that the buyer has a propensity to experience buyer's remorse, grow dissatisfied with a purchased product, and lower the seller's star rating because of a perceived lack of value. There are risks that an authentic buyer, with good credit, a low return rate, and negligible propensity to become dissatisfied with products, will simply misuse a product. For example, a buyer who has never purchased boat equipment before may tend to have a higher risk of misusing a high-power jet ski. Product misuse may result in product liability for the seller of the item.

In one embodiment, individual risk levels 402, 404, and 406 may be calculated for seller 100 for fraud, nonreturnable items, and defects, respectively. Individual risk levels 412, 414, 416, 418, and 420 may be calculated for buyer 104 for fraud, credit, return/chargebacks, dissatisfaction, and product misuse, respectively. Seller fraud risk level 402 may be calculated using a different algorithm and different inputs from buyer fraud risk level 412, or the inputs and algorithms may be the same. Seller fraud risk level 402 can be considered of the same type as buyer fraud risk level 412. Seller and buyer risk scores can be calculated in a server such as those in brokering website 102 (FIG. 1) or risk analysis system 114, payment processing network 210 (FIG. 2), acquirer 208, or issuer 212, or by distributed processors.

Figure 5:
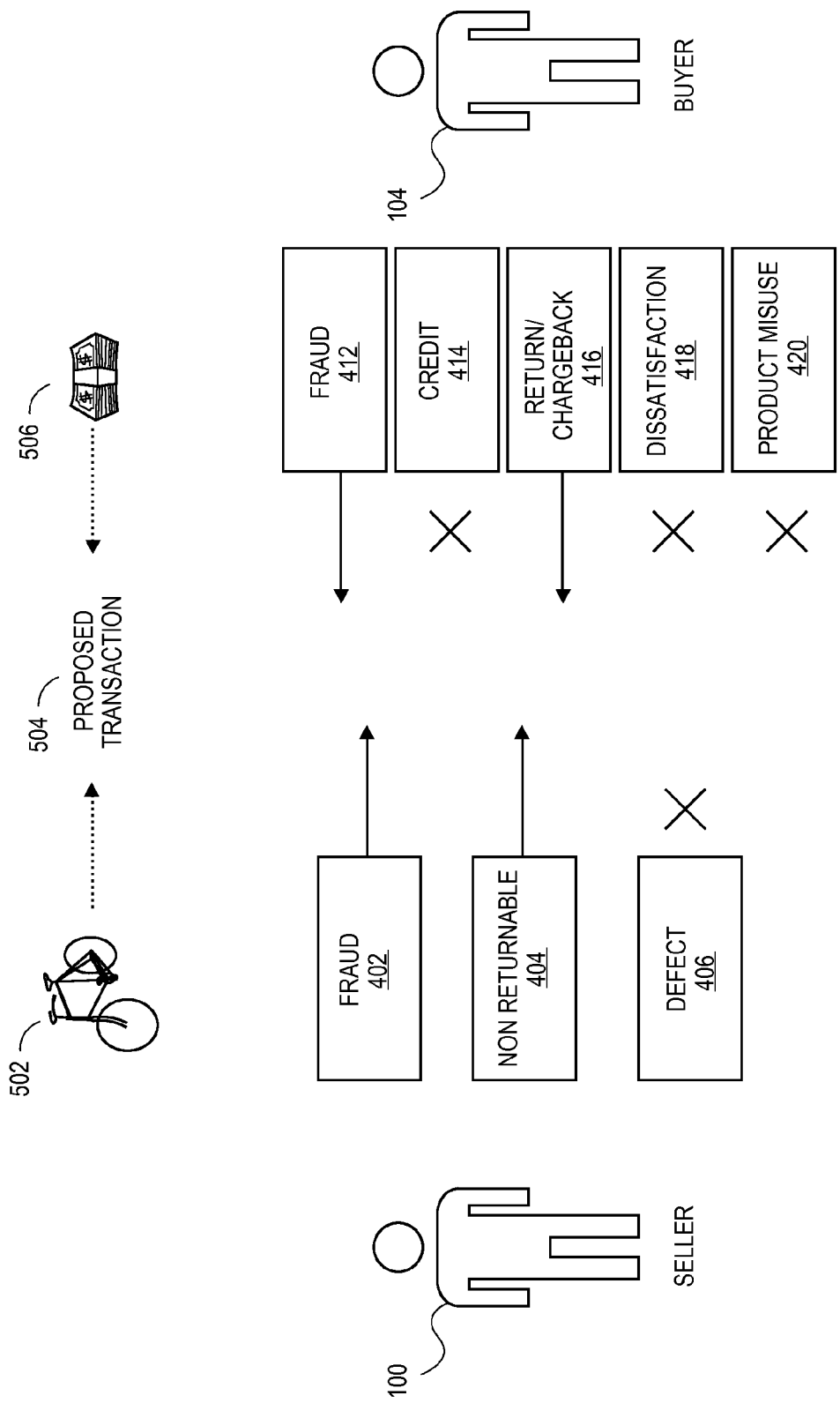
FIG. 5 illustrates swapping risk levels for a proposed transaction in accordance with an embodiment.

FIG. 5 illustrates swapping risk levels for a proposed transaction. Seller 100 and buyer 104 wish to exchange bicycle 502 for money 506 in proposed transaction 504 through brokering website 102 (FIG. 1). Seller 100 authorizes fraud risk level 402 to be disclosed to buyer 104 as long as buyer 104 authorizes his own fraud risk level 412 to be disclosed to seller 100. Seller 100 also authorizes nonreturnable risk level 404 to be disclosed as long as buyer 104 authorizes return/chargeback risk level 416 to be disclosed. Seller refuses to disclose defect risk level 406; therefore, defect risk level 406 is withheld (or not calculated in the first place). Buyer 104 withholds credit, dissatisfaction, and product misuse risk levels 414, 418, and 420 for privacy reasons. The authorizations and disclosures can be processed through risk analysis system 114 (FIG. 1) as well as brokering website 102.

After fraud risk levels 402 and 412 and nonreturnable and return/chargeback risk levels 404 and 416 are disclosed to the opposite parties, the proposed transaction may be pursued with higher confidence, or at least a more informed confidence, that the transaction is worth the risk and effort.

Figure 6:
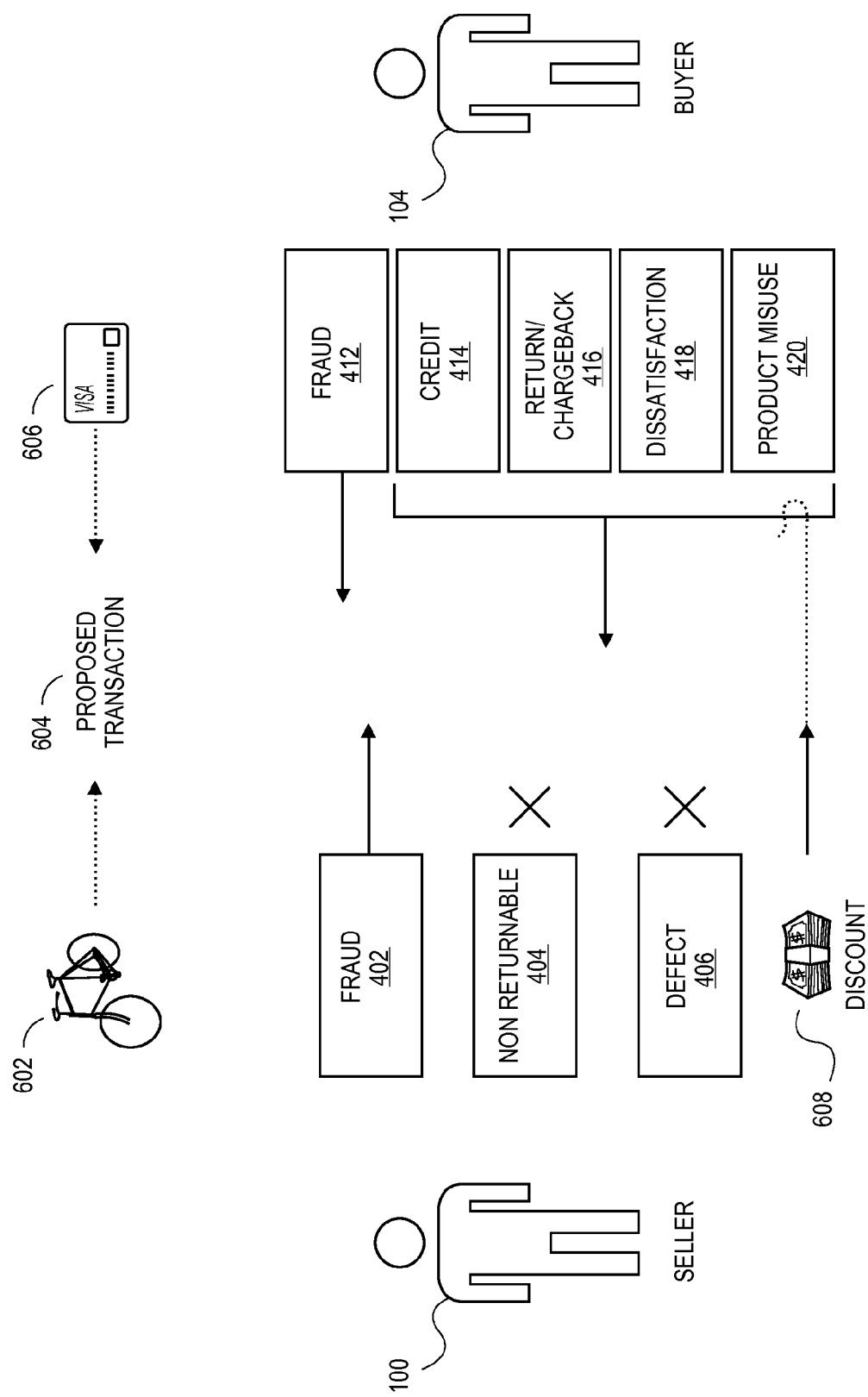
FIG. 6 illustrates a discount for providing risk levels in accordance with an embodiment.

FIG. 6 illustrates a discount for providing risk levels. Seller 100 and buyer 104 wish to exchange bicycle 602 for money via credit card 606, in proposed transaction 604 on brokering website 102 (FIG. 1). Both parties disclose their fraud scores 402 and 412 with one another using risk analysis system 114 (FIG. 1). Seller 100 offers discount 608 if buyer discloses his credit, return/chargeback, dissatisfaction, and misuse risk levels. For example, seller 100 may offer a 2% discount for bicycle 602 if buyer 104 discloses the risk levels. By offering discount 608, seller can attract better buyers, or at least buyers who are upfront about their buying history.

Figure 7:
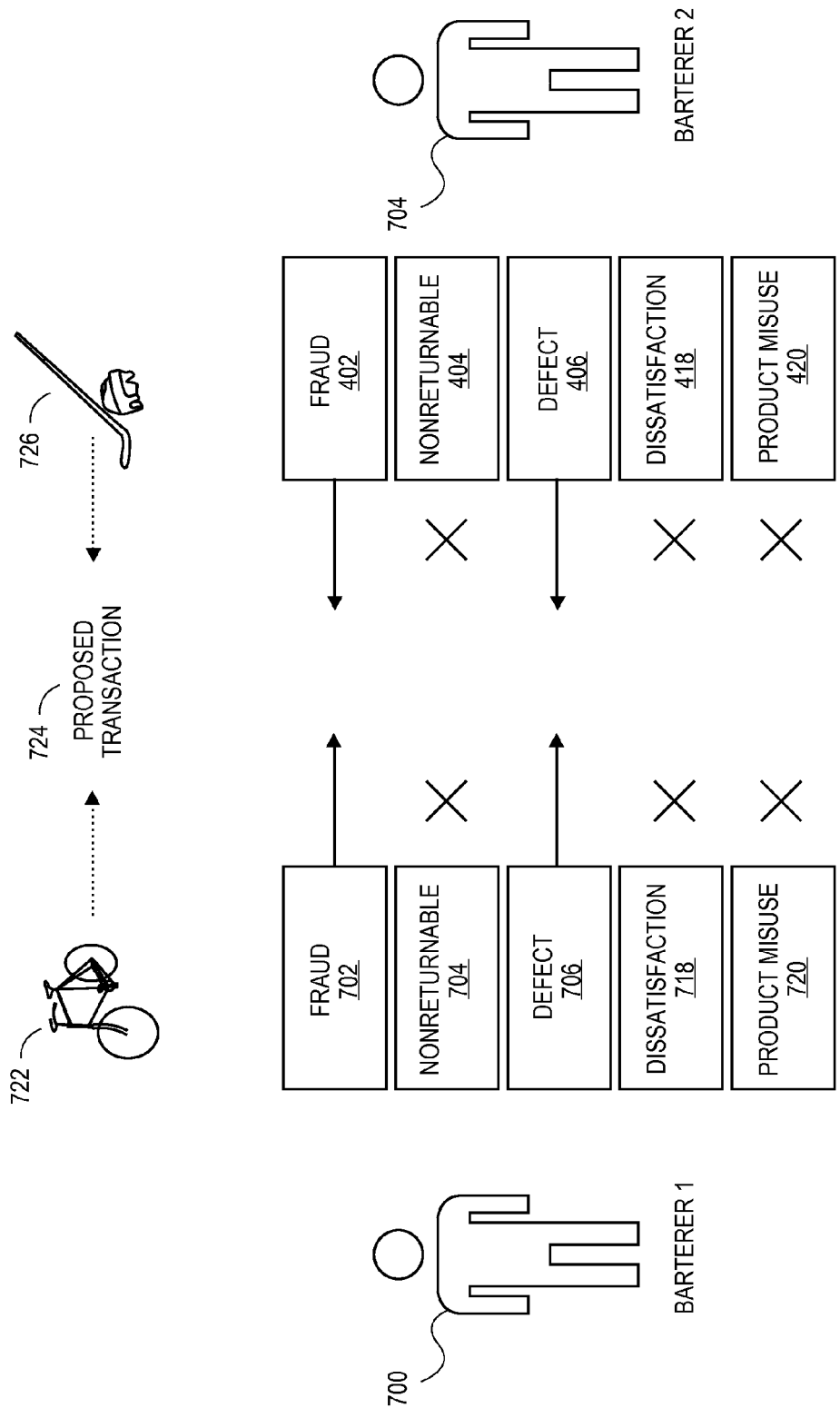
FIG. 7 illustrates swapping risk levels for bartered goods in accordance with an embodiment.

FIG. 7 illustrates swapping risk levels in a bartered goods transaction. Barterer 700 and barterer 704 wish to exchange bicycle 722 for hockey equipment 726 in proposed transaction 724 on brokering website 102 (FIG. 1). Because this is a barter exchange, risk levels associated with both buyers and sellers can be associated with each barterer. Barterer 1's set of risk levels include fraud risk level 702, nonreturnable risk level 704, defect risk level 706, dissatisfaction risk level 718, and misuse risk level 720. Barterer 2's set of risk levels include fraud risk level 402, nonreturnable risk level 404, defect risk level 406, dissatisfaction risk level 418, and misuse risk level 420.

Barterer 1 sets up his brokerage website profile on brokering website 102 (FIG. 1) or directly through risk analysis system 114 to authorize the release or disclosure of any risk level that an opposing party discloses. Barterer 2 sets up her brokerage website profile to only release her fraud risk level 402 and defect risk level 406 as long as the other side is ready and able to disclose the same. Under these preferences, only risk levels 702, 706, 402, and 406 are disclosed to the opposing party while risk levels 704, 718, 720, 404, 418, and 420 are withheld. If each party is satisfied with the other party's risk levels, then they can move on to transfer the goods or can transfer further risk levels in order to further grow comfortable with each other.

Figure 8:
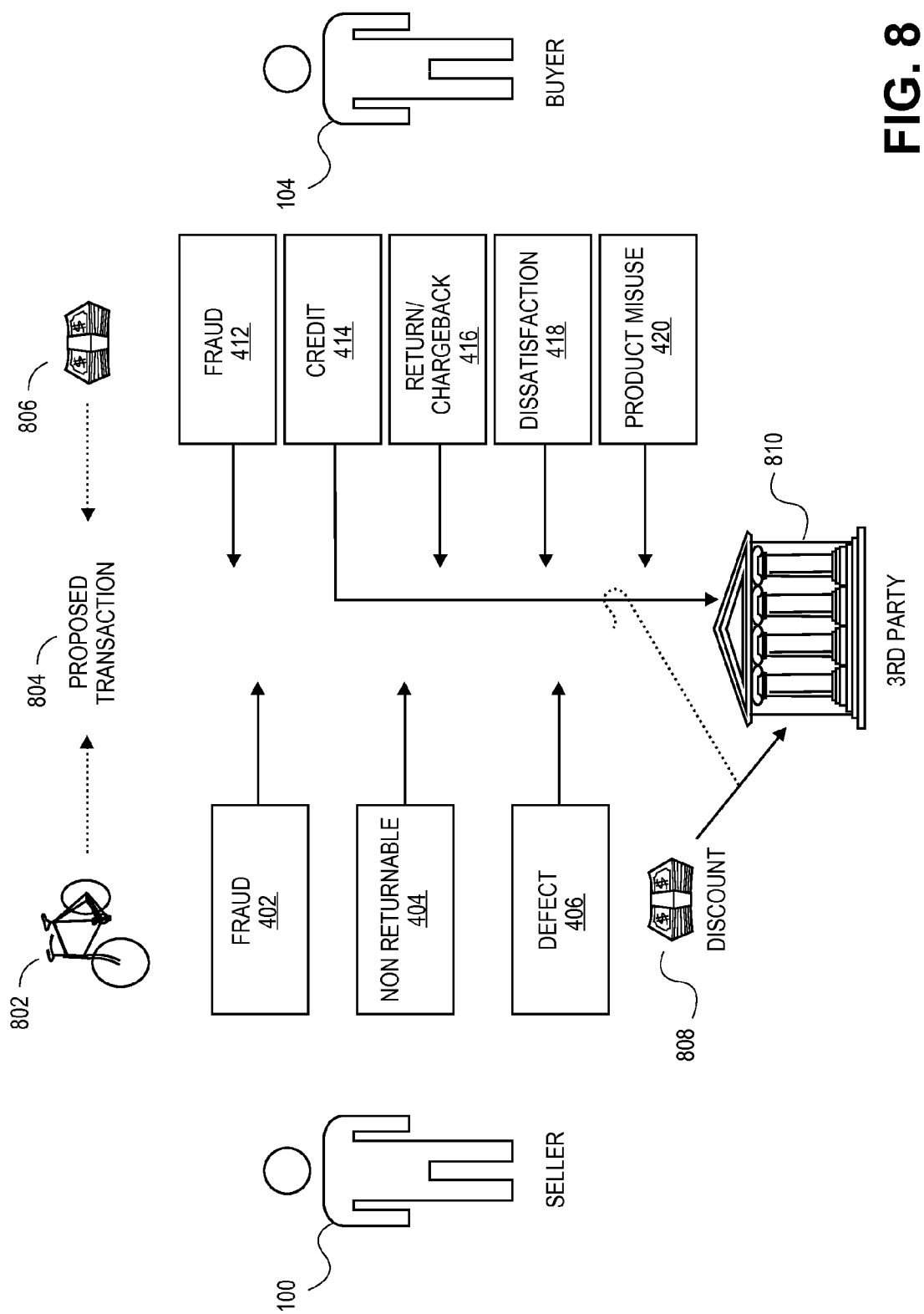
FIG. 8 illustrates a 3rd party escrow deal in accordance with an embodiment.

FIG. 8 illustrates a 3rd party escrow deal with the disclosure of consumers' risk levels. Seller 100 and buyer 104 wish to exchange bicycle 802 for money 806 at a later date in proposed transaction 804 on brokering website 102 (FIG. 1). Seller 100 discloses his fraud, nonreturnable, and defect risk levels 402, 404, and 406. Buyer 104 discloses his fraud, return/chargeback, dissatisfaction, and misuse risk levels 412, 416, 418, and 420 to seller 100.

Buyer 104 may feel uncomfortable giving seller 100, another consumer, her credit risk level, but seller 100 would feel much better about the delayed cash transaction if he had some indication of the buyer's credit. A compromise is found if 3rd party 810, whom both seller 100 and buyer 104 trust, is provided buyer credit risk level 414, and 3rd party 810 gives seller an indication of the risk or assumes the credit risk entirely. For its services, payment 808, which might have been otherwise offered as a discount to the buyer, can be given to 3rd party 810. 3rd party 810 can be a trusted middleman between the two consumers, such as owner of the brokering website upon which the transaction is proposed (e.g. brokering website 102 of FIG. 1), or a separate entity, such as the branded owner of a payment processing network (e.g. payment processing network 210 of FIG. 2).

Figure 9:
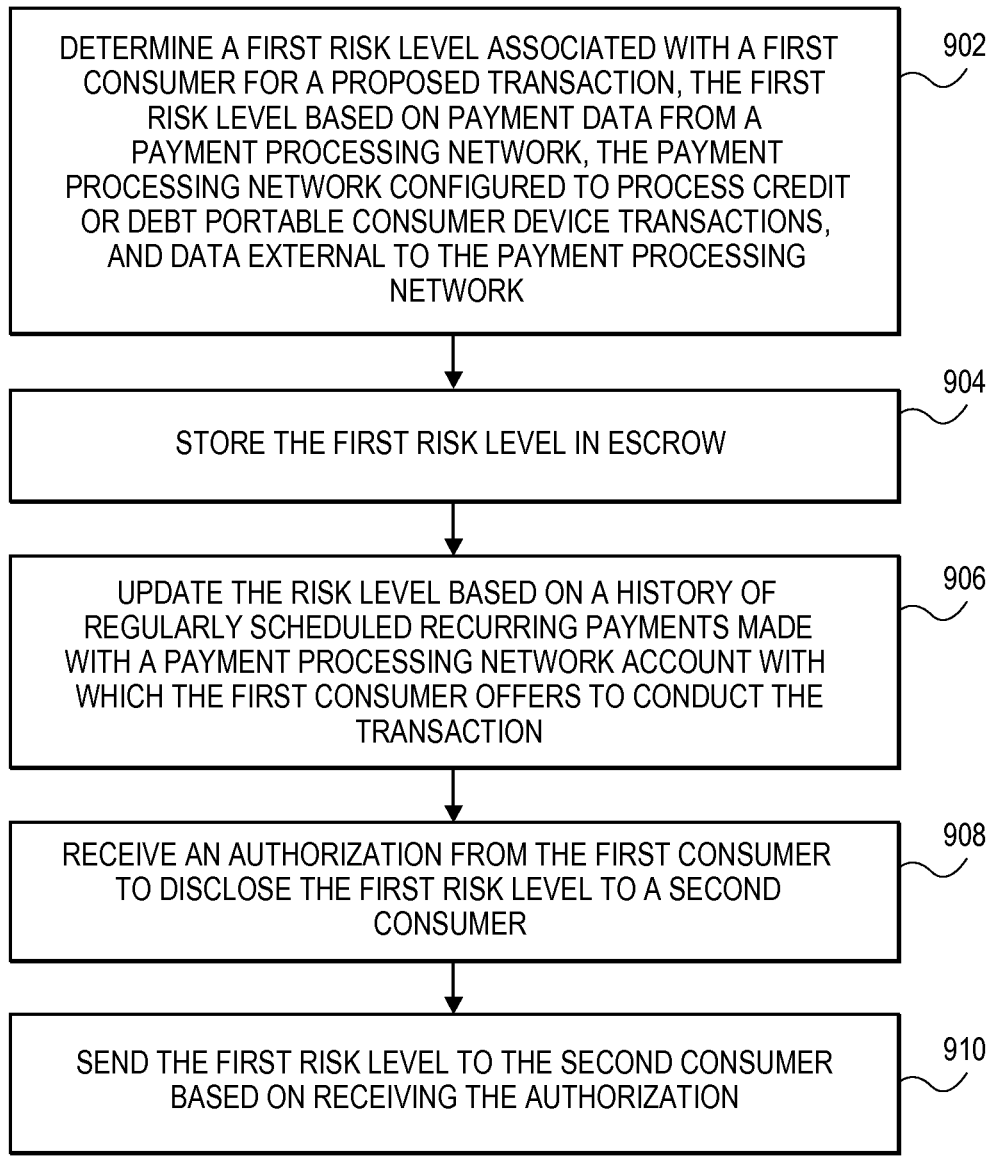
FIG. 9 is a flowchart illustrating a process in accordance with an embodiment.

FIG. 9 is a flowchart illustrating a process in accordance with an embodiment. The operations shown in the flowchart and other flowcharts can be performed by a computer with a processor and memory or other machine, and the operations in the flowcharts can be stored as machine-readable instructions and accessed by a processor such as those in risk analysis system 114 (FIG. 1) or operated by payment processing network 210 (FIG. 2). In operation 902, a first risk level associated with a first consumer for a proposed transaction is determined, the first risk level based on payment data from a payment processing network. The payment processing network is configured to process credit or debit portable consumer device transactions. The first risk level is also based on data external to the payment processing network. In operation 904, the first risk level is stored in escrow, such as that managed by 3rd party 810 (FIG. 8). The 3rd party may be the first consumer's credit card issuer bank and the first risk level may be stored on issuer 212's (FIG. 2) servers or data farms, for example. In operation 906, the risk level is updated based on a history of regularly scheduled recurring payments made with a payment processing network account with which the first consumer offers to conduct the transaction. In operation 908, an authorization is received from the first consumer to disclose the first risk level to a second consumer. In operation 910, the first risk level is sent to the second consumer based on receiving the authorization.

Figure 10:
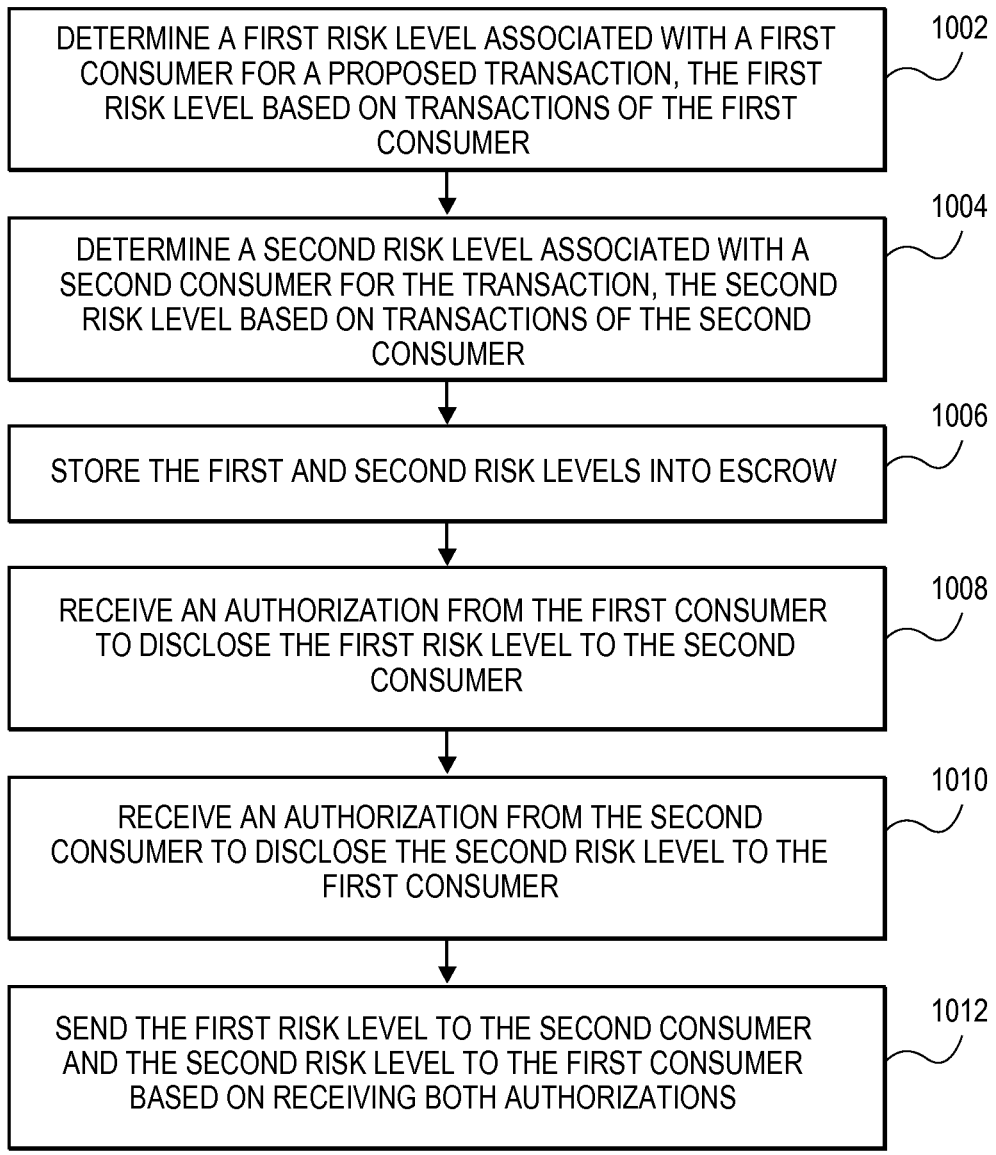
FIG. 10 is a flowchart illustrating a process in accordance with an embodiment.

FIG. 10 is a flowchart illustrating a process in accordance with an embodiment. In operation 1002, a first risk level associated with a first consumer for a proposed transaction is determined, the first risk level based on transactions of the first consumer. In operation 1004, a second risk level associated with a second consumer for the transaction is determined, the second risk level based on transactions of the second consumer. In operation 1006, the first and second risk levels are stored into escrow. In operation 1008, an authorization is received from the first consumer to disclose the first risk level to the second consumer. In operation 1010, an authorization is received from the second consumer to disclose the second risk level to the first consumer. In operation 1012, the first risk level is sent to the second consumer and the second risk level is sent to the first consumer based on receiving both authorizations.

Figure 11:
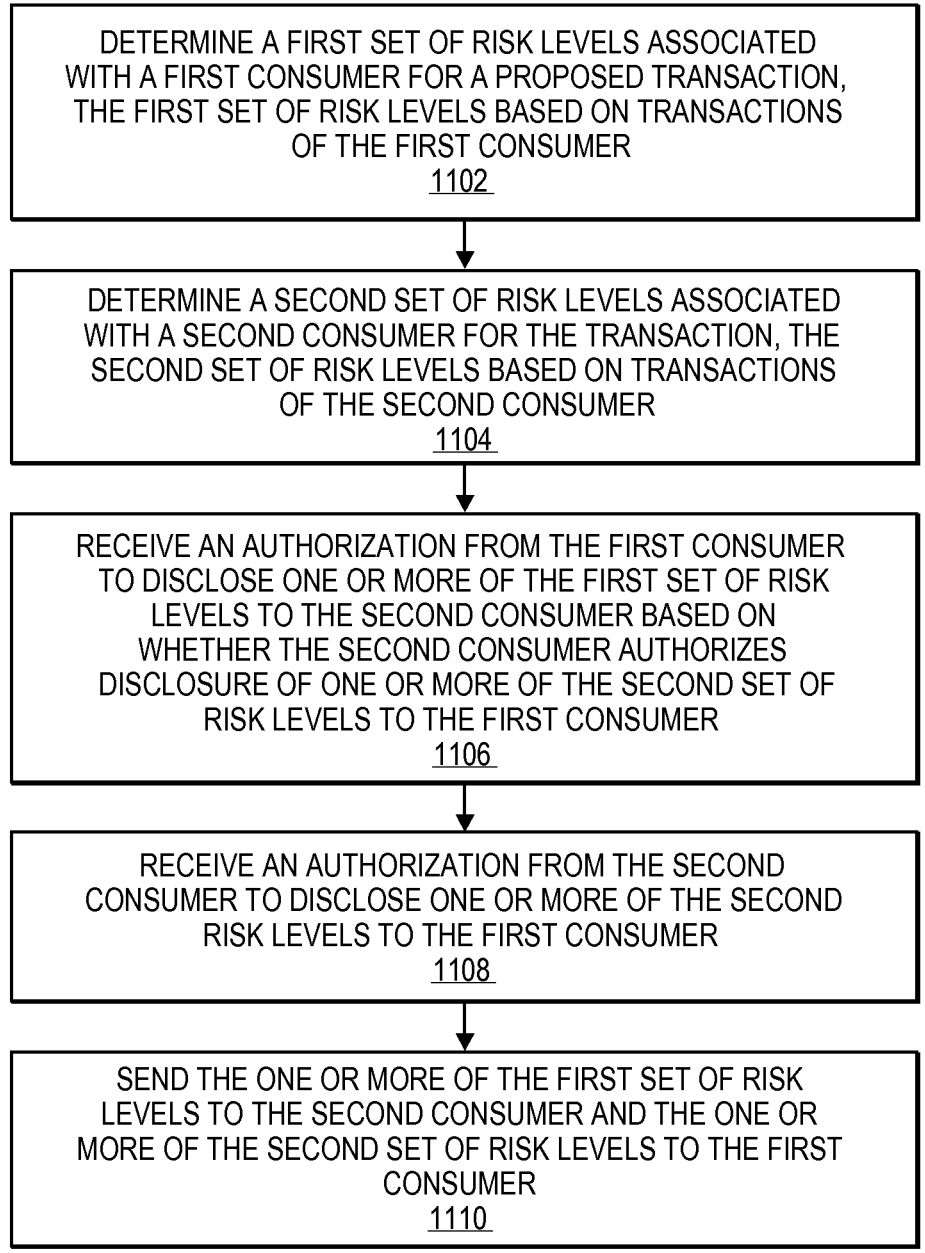
FIG. 11 is a flowchart illustrating a process in accordance with an embodiment.

FIG. 11 is a flowchart illustrating a process in accordance with an embodiment. In operation 1102, a first set of risk levels associated with a first consumer for a proposed transaction is determined, the first set of risk levels based on transactions of the first consumer. In operation 1104, a second set of risk levels associated with a second consumer for the transaction is determined, the second set of risk levels based on transactions of the second consumer. In operation 1106, an authorization from the first consumer is received to disclose one or more of the first set of risk levels to the second consumer based on whether the second consumer authorizes disclosure of one or more of the second set of risk levels to the first consumer. In operation 1108, an authorization from the second consumer is received to disclose one or more of the second risk levels to the first consumer. In operation 1110, the one or more of the first set of risk levels are sent to the second consumer and the one or more of the second set of risk levels are sent to the first consumer, based on the received authorizations.

The various participants and elements in the aforementioned figures may operate one or more computer apparatuses to facilitate the functions described herein. Any of the elements in the figure may use any suitable number of subsystems to facilitate the functions described herein.

Figure 12:
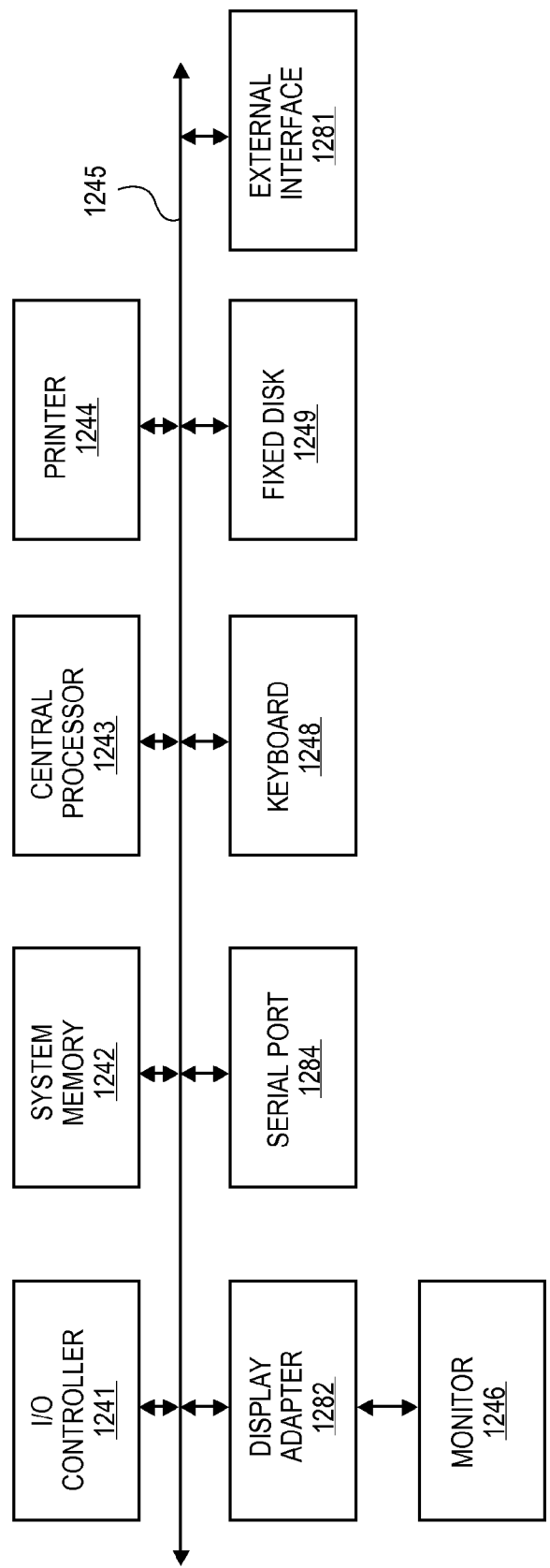
FIG. 12 shows a block diagram of an exemplary computer apparatus.

FIG. 12 is a high level block diagram of a computer system that may be used to implement any of the systems or components (e.g., brokering website 102, risk analysis system 114, consumer A computer system 100, consumer B computer system 104, etc.) described above. The subsystems shown in FIG. 12 are interconnected via a system bus 1245. Additional subsystems such as a printer 1244, keyboard 1248, fixed disk 1249, monitor 1246, which is coupled to display adapter 1282, and others are shown. Peripherals and input/output (I/O) devices, which couple to I/O controller 1241, can be connected to the computer system by any number of means known in the art, such as serial port 1284. For example, serial port 1284 or external interface 1281 can be used to connect the computer apparatus to a wide area network such as the Internet, a mouse input device, or a scanner. The interconnection via system bus 1245 allows the central processor 1243 to communicate with each subsystem and to control the execution of instructions from system memory 1242 or the fixed disk 1249, as well as the exchange of information between subsystems. The system memory 1242 and/or the fixed disk 1249 may embody a computer readable medium.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

A recitation of "a", "an" or "the" is intended to mean "one or more" unless specifically indicated to the contrary.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

What is claimed is:
1. A method comprising:
   determining, using a processor operatively coupled to a memory, a first risk level associated with a first consumer for a proposed transaction, the first risk level based on payment data from a payment processing network, the payment processing network configured to process credit or debit portable consumer device transactions, and data external to the payment processing network;

receiving an authorization from the first consumer to disclose the first risk level to a second consumer; and sending the first risk level to the second consumer based on receiving the authorization.

2. The method of claim 1 wherein the first risk level is based on a history of regularly scheduled recurring payments made with a payment processing network account with which the first consumer offers to conduct the transaction.

3. The method of claim 1 wherein the first risk level is based on a measure of how soon after bills are issued for a credit card account that non-late payments for the respective bills are made to the account, the account being associated with the first consumer.

4. The method of claim 1 wherein the first risk level is based on a history of returns or chargebacks associated with the first consumer.

5. The method of claim 1 wherein the first risk level is based on a history of the first consumer purchasing a type of merchandise to be purchased in the transaction.

6. The method of claim 1 wherein the first risk level is based on a past level of spend on an account with which the first consumer offers to conduct the transaction.

7. The method of claim 1 wherein the first risk level is further based on at least one of the group consisting of:
- a type of merchandise to be purchased in the transaction;
- a channel by which the transaction is offered to be completed;
- a geographic location of the first consumer determined from an Internet Protocol (IP) address associated with the first consumer; and
- a fraud flag associated with an account with which the first consumer offers to conduct the transaction or other accounts of the consumer.

8. The method of claim 1 wherein the proposed transaction is on a brokering website.

9. The method of claim 1 wherein the data external to the payment processing network includes a star rating system of a brokering website.

10. The method of claim 1 wherein each operation is performed by the processor operatively coupled to the memory.

11. A machine-readable storage medium embodying information indicative of instructions for causing one or more machines to perform the operations of claim 1.

12. A computer system executing instructions in a computer program, the computer program instructions comprising program code for performing the operations of claim 1.

13. A method comprising:
determining, using a processor operatively coupled to a memory, a first risk level associated with a first consumer for a proposed transaction, the first risk level based on transactions of the first consumer;

determining a second risk level associated with a second consumer for the transaction, the second risk level based on transactions of the second consumer;

receiving an authorization from the first consumer to disclose the first risk level to the second consumer;

receiving an authorization from the second consumer to disclose the second risk level to the first consumer;

sending the first risk level to the second consumer and the second risk level to the first consumer based on receiving both authorizations.

14. The method of claim 13 further comprising:
determining a third risk level associated with the first consumer for the transaction, the third risk level based on transactions of the first consumer and assessing different attributes of the first consumer than the first risk level;

determining a fourth risk level associated with the second consumer for the transaction, the fourth risk level based on transactions of the second consumer and assessing different attributes of the transactions of the second consumer than the second risk level;

sending the third and fourth risk levels to the second and first consumers, respectively, based on receiving respective authorizations from the first and second consumers.

15. The method of claim 13 wherein the first and second risk levels are of a same type.

16. The method of claim 13 further comprising:
storing the first and second risk levels onto escrow.

17. The method of claim 13 wherein the first consumer is a potential tenant and the second consumer is a landlord.

18. A method comprising:
determining, using a processor operatively coupled to a memory, a first set of risk levels associated with a first consumer for a proposed transaction, the first set of risk levels based on transactions of the first consumer;

determining a second set of risk levels associated with a second consumer for the transaction, the second set of risk levels based on transactions of the second consumer;

receiving an authorization from the first consumer to disclose one or more of the first set of risk levels to the second consumer based on whether the second consumer authorizes disclosure of one or more of the second set of risk levels to the first consumer;

receiving an authorization from the second consumer to disclose one or more of the second set of risk levels to the first consumer;

sending the one or more of the first set of risk levels to the second consumer and the one or more of the second set of risk levels to the first consumer.

19. The method of claim 18 wherein a type of risk level associated with the first consumer is disclosed to the second consumer on condition that a same type of risk levels associated with the second consumer is disclosed to the first consumer.

* * * * *